US010535144B1

(12) United States Patent
Moshtagh et al.

(10) Patent No.: US 10,535,144 B1
(45) Date of Patent: Jan. 14, 2020

(54) PROJECTIVE PARTICLE FILTER FOR MULTI-SENSOR FUSION

(71) Applicant: LOCKHEED MARTIN CORPORATION, Bethesda, MD (US)

(72) Inventors: Nima Moshtagh, Menlo Park, CA (US); Paul Martin Romberg, San Jose, CA (US); Moses W. Chan, San Carlos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 422 days.

(21) Appl. No.: 14/684,288

(22) Filed: Apr. 10, 2015

(51) Int. Cl.
*H04N 7/18* (2006.01)
*H04N 5/232* (2006.01)
*G06K 9/00* (2006.01)
*G06T 7/20* (2017.01)

(52) U.S. Cl.
CPC .......... *G06T 7/2093* (2013.01); *G06K 9/0063* (2013.01); *H04N 5/23216* (2013.01); *H04N 7/181* (2013.01); *G06T 2207/10032* (2013.01); *G06T 2207/30241* (2013.01)

(58) Field of Classification Search
CPC ......... G06T 7/2093; G06T 2207/10032; G06T 2207/30241; G06K 9/0063; H04N 5/23216; H04N 7/181
USPC ....................................................... 348/144
See application file for complete search history.

(56) References Cited

U.S. PATENT DOCUMENTS

| 6,882,959 | B2 * | 4/2005 | Rui .................... G06T 7/277 342/64 |
| 7,026,980 | B1 * | 4/2006 | Mavroudakis ........ G01S 13/723 342/101 |
| 7,035,764 | B2 * | 4/2006 | Rui .................... G06T 7/277 342/64 |
| 7,376,246 | B2 * | 5/2008 | Shao ................... G06K 9/3216 382/103 |
| 8,106,340 | B1 * | 1/2012 | Diaz .................... F41G 7/008 244/3.1 |
| 9,250,043 | B1 * | 2/2016 | Block .................. F41H 11/02 |
| 2004/0021770 | A1 * | 2/2004 | Krill ................... H04N 7/181 348/117 |

(Continued)

OTHER PUBLICATIONS

Gupta P. et al. "Multisensor Data Product Fusion for Aerosol Research", IEEE Transactions on Geoscience and Remote Sensing, vol. 46, No. 5, May 2008.*

(Continued)

*Primary Examiner* — Richard A Hansell, Jr.
(74) *Attorney, Agent, or Firm* — Morgan, Lewis & Bockius LLP

(57) ABSTRACT

A method for multi-sensor fusion using a projective particle filter includes measuring, using a plurality of sensors, data related to one or more objects. A higher dimensional state space may be sampled using particle data. Particle data may be projected onto an observation space to extract measurement data. The measurement data are combined to infer higher-dimensional information. The higher dimensional state space includes presumed information related to one or more states associated with the one or more objects. The higher-dimensional information includes estimated information related to one or more states associated with the one or more objects.

20 Claims, 10 Drawing Sheets

(56) References Cited

U.S. PATENT DOCUMENTS

| | | | |
|---|---|---|---|
| 2007/0127101 A1* | 6/2007 | Oldroyd | G01C 11/00 359/24 |
| 2009/0175500 A1* | 7/2009 | Kizuki | G08B 13/19608 382/103 |
| 2010/0296697 A1* | 11/2010 | Ikenoue | H04N 7/18 382/103 |
| 2011/0178658 A1* | 7/2011 | Kotaba | G01C 21/005 701/3 |
| 2017/0225760 A1* | 8/2017 | Sidki | B63H 25/04 |

OTHER PUBLICATIONS

Xie Y. "Detection of Smoke and Dust Aerosols Using Multi-sensor Satellite Remote Sensing Measurements", Dissertation, Spring Semester 2009.*

Delanoë J. and R.J. Hogan, "Combined CloudSat-CALIPSO-MODIS retrievals of the properties of ice clouds", JGR, vol. 115. D00H29, doi: 10.1029/2009JD012346, 2010.*

Schemtz J. and K. Holmlund "Operational Cloud-Motion Winds from Meteosat Infrared Images", J. Applied Meteorology, vol. 32, 1993.*

Diner et al. "A Multiangle Imaging Spectroradiometer for Terrestrial Remote Sensing from the Earth Observing System", International Journal of Imaging Systems and Technology, vol. 3, 92-107 (1991).*

Kahn R. A. et al. "MISR Aerosol Product Attributes and Statistical Comparisons with MODIS", IEEE Transactions on Geoscience and Remote Sensing, vol. 47, No. 12, Dec. 2009.*

Griffin D.W. "Atmospheric Movement of Microorganisms in Clouds of Desert Dust and Implications for Human Health", Clinical Microbiology Reviews, Jul. 2007, p. 459-477, doi:10.1128/CMR.00039-06.*

Bouttefroy P.L.M., A. Bouzerdoum, S.L. Phung, and A. Beghdadi, "Integrating the Projective transform with Particle Filtering for Visual Tracking", EURASIP J. Image and Video Processing, vol. 2011, Article ID 839412, 11 pgs., doi:10.1155/2011/839412, 2011.*

Vadakkepat P. and L. Jing, "Improved Particle Filter in Sensor Fusion for Tracking Randomly Moving Object", IEEE Transactions on Instrumentation and Measurement, vol. 55, No. 5, Oct. 2006.*

Loy et al. "An Adaptive Fusion Architecture for Target Tracking", Proceedings of the Fifth IEEE International Conference on automatic Face and Gesture Recognition (FGR'02), 2002.*

Alejo D. et al. "Multi-UAV collision avoidance with separation assurance under uncertainties" Proceedings of the 2009 IEEE International Conference on Mecharonics, Malaga, Spain, Apr. 2009 (Year: 2009).*

Shi Z.G. et al. "Tracking Airborne Targets Hidden in Blind Doppler Using Current Statistical Model Particle Filter" Progress in Electromagnetics Research, PIER 82, 227-240, 2008 (Year: 2008).*

Bouttefroy P.L.M., A. Bouzerdoum, S.L. Phung, and A. Beghdadi, "Integrating the Projective transform with Particle Filtering for Visual Tracking", EURASIP J. Image and Video Processing, vol. 2011, Article ID 839412, 11 pgs., doi:10.1155/2011/839412, 2011 (Year: 2011).*

Vadakkepat P. and L. Jing, "Improved Particle Filter in Sensor Fusion for Tracking Randomly Moving Object", IEEE Transactions on Instrumentation and Measurement, vol. 55, No. 5, Oct. 2006 (Year: 2006).*

Loy et al. "An Adaptive Fusion Architecture for Target Tracking", Proceedings of the Fifth IEEE International Conference on automatic Face and Gesture Recognition (FGR'02), 2002 (Year: 2002).*

Gupta P. et al. "Multisensor Data Product Fusion for Aerosol Research", IEEE Transactions on Geoscience and Remote Sensing, vol. 46, No. 5, May 2008 (Year: 2008).*

Xie Y. "Detection of Smoke and Dust Aerosols Using Multi-sensor Satellite Remote Sensing Measurements", Dissertation, Spring Semester 2009 (Year: 2009).*

Delanoe J. and R.J. Hogan, "Combined CloudSat-CALIPSO-MODIS retrievals of the properties of ice clouds", JGR, vol. 115. D00H29, doi: 10.1029/2009JD012346, 2010 (Year: 2010).*

Schemtz J. and K. Holmlund "Operational Cloud-Motion Winds from Meteosat Infrared Images", J. Applied Meteorology, vol. 32, 1993 (Year: 1993).*

Diner et al. "A Multiangle Imaging Spectroradiometer for Terrestrial Remote Sensing from the Earth Observing System", International Journal of Imaging Systems and Technology, vol. 3, 92-107 (1991) (Year: 1991).*

Kahn R. A. et al. "MISR Aerosol Product Attributes and Statistical Comparisons with MODIS", IEEE Transactions on Geoscience and Remote Sensing, vol. 47, No. 12, Dec. 2009. (Year: 2009).*

Griffin D.W. "Atmospheric Movement of Microorganisms in Clouds of Desert Dust and Implications for Human Health", Clinical Microbiology Reviews, Jul. 2007, p. 459-477, doi:10.1128/CMR.00039-06. (Year: 2007).*

* cited by examiner

PROJECTIVE PARTICLE FILTER FOR MULTI-SENSOR FUSION

FIELD OF THE INVENTION

The present invention generally relates to sensor-data processing, more particularly, to projective particle filter for multi-sensor fusion.

SUMMARY

In some aspects, a method for multi-sensor fusion includes measuring, using a plurality of sensors, data related to one or more objects. A higher dimensional state space may be sampled using particle data. Particle data may be projected onto an observation space to extract measurement data. The measurement data are combined to infer higher-dimensional information. The higher dimensional state space includes presumed information related to one or more states associated with the one or more objects. The higher-dimensional information includes estimated information related to one or more states associated with the one or more objects.

In another aspect, a system for performing multi-sensor fusion includes a plurality of sensors configured to measure data related to one or more objects, and a projective particle filter. The projective particle filter includes a sampling block, a projection block, and a fusion block. The sampling block is configured to sample a higher dimensional state space using particle data. The projection block is configured to project particle data onto an observation space to extract measurement data. The fusion block is configured to combine the measurement data to infer higher-dimensional information. The higher dimensional state space comprises presumed information related to one or more states associated with the one or more objects. The higher-dimensional information comprises estimated information related to one or more states associated with the one or more objects.

In yet another aspect, a system includes a plurality of sensors configured to measure data related to a moving target and a projective particle filter. The projective particle filter includes a sampling block, a projection block and a fusion block. The sampling block is configured to sample a higher dimensional state space using particle data (e.g., a state) associated with points in a three-dimensional (3-D) space. The projection block is configured to project particle data onto an observation space including measurement data related to the moving target to extract measurement data. The fusion block is configured to combine the measurement data to infer higher-dimensional information including information related to one or more states associated with the moving target.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1A:
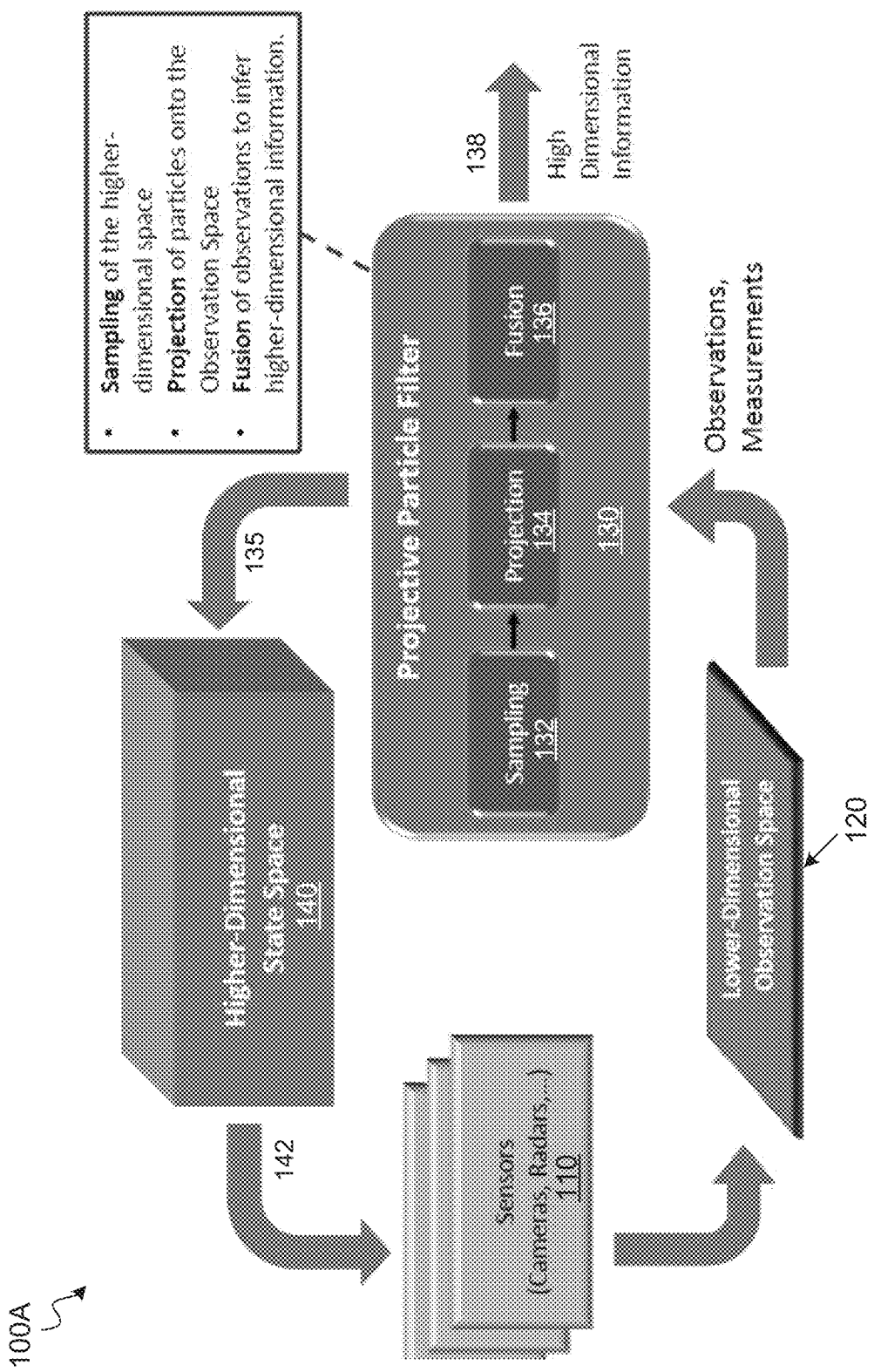
FIGS. 1A-1B are diagrams illustrating examples of a high-level architecture of a system for multi-sensor fusion using a projective particle filter, according to certain embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present disclosure is directed, in part, to methods and systems for multi-sensor fusion using a projective particle filter. The subject technology allows forming a higher dimensional (e.g., three dimensional (3-D)) entity from a number of lower dimensional (e.g., two dimensional (2-D)) entities. In one or more implementations, the subject technology enables sampling a higher dimensional state space using particle data, projecting particle data onto an observation space to extract measurement data, and combining the measurement data to infer higher-dimensional information. Particles refer to the points in the higher dimensional state. The particle data refers to data associated with a particle. The data associated with a particle can be a state (e.g., a position, a velocity, an acceleration, a size, a type, etc.) of an object such as a moving target.

In some aspects, the subject solution may be applied, for example, to space-based sensors for detection and tracking of a moving target (e.g., a missile). The disclosed solution can estimate the state of a target in the 3D space using images from multiple sensors (e.g., electro-optical (EO) sensors such as infrared (IR) sensors, radar antennas, or other sensors). The advantage of using overhead imaging sensors is to acquire and track missiles during the boost phase. Missile detection and tracking with space-based sensors can be challenging due to significant degradation and corruption of target signature by the atmospheric transmission and clutter effect. The main challenge is to track such dim targets in the cluttered background, and hold the track as long as possible during the post-boost phase. Imaging sensors provide only line-of-sight (LOS) measurements, and therefore using only one imaging sensor is not sufficient to estimate 3-D state of a target. Hence, the 3-D target tracking requires fusion of sensor data from multiple imaging sensors. Also, the conventional methods of detection and tracking have difficulty with tracking dim targets. The disclosed approach can estimate the 3-D trajectory of dim targets using multiple imaging sensors.

The subject technology provides a projective particle filter (PPF) method for fusion of images froth multiple imaging sensors. The PPF method may run on a central fusion center, where the sensor data are received and fused to generate the 3-D state estimates. In some implementations, the PPF algorithm implements a track-before-detect (TBD) filter because it does not employ any target detection methods such as thresholding of the input images. Instead, the PPF algorithm treats the images as measurements. The disclosed approach is to project the 3D particles of the PF onto the image plane of the sensors, and use their corresponding pixel intensities as measurements, resulting in direct fusion of the measurements from multiple sensors.

Figure 1B:
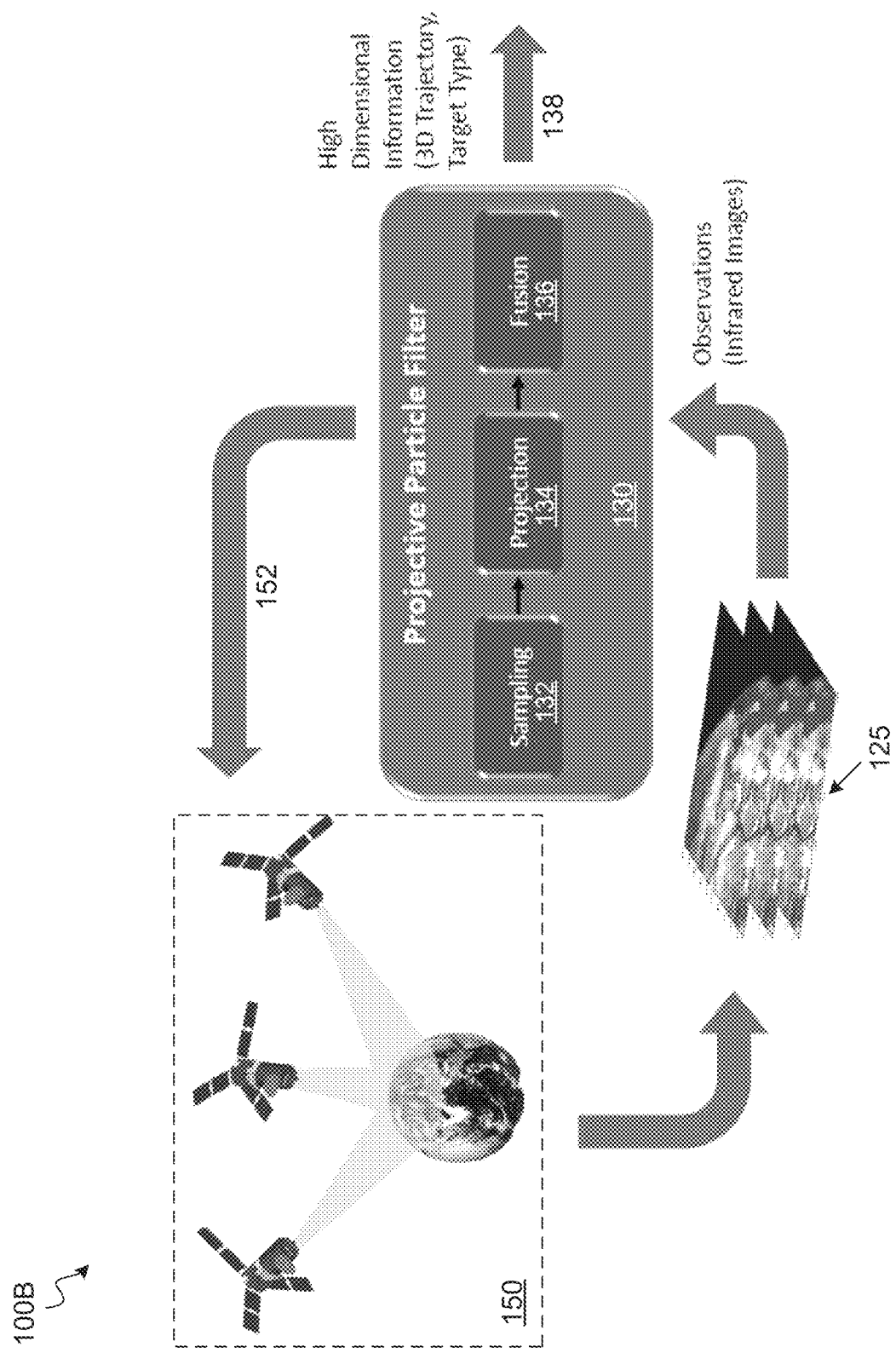

FIGS. 1A-1B are diagrams illustrating examples of a high-level architecture of a system 100A for multi-sensor fusion using a projective particle filter 130, according to certain embodiments. The system 100A includes a number of sensors 110 (e.g., EO sensors, such as IR sensors, cameras, or radar antennas) and the projective particle filter 130. The sensors 110 may generate data in a lower-dimensional space (e.g., 2-D images) 120 related to an object such as a moving target (e.g., a missile). The data in the lower-dimensional space 120 are processed by a feature extraction block (not shown herein for simplicity), which extracts useful (low-dimensional) data from the sensor raw data. The processed low-dimensional data are fused by the projective particle filter 130 to generate higher dimensional information 138. The projective particle filter 130 includes a sampling block 132, a projection block 134, and a fusion block 136, which can he implemented in hardware, firmware and/or software. Any component of the projective particle filter 130, if implemented in software, is executed by one or more processors that can be part of the system 100A and are not shown in FIG. 1A for simplicity or by a remote processor.

The sampling block 132 is configured to sample higher dimensional state-space 140 using particle data as will be discussed in more details herein. The projection block 134 is configured to project the sampled particle data onto an observation space to extract measurement data. The observation space includes the lower-dimensional space 120 produced by sensors 110. The fusion block 136 is configured to combine the measurement data to infer higher-dimensional information such as estimated information related to one or more states (e.g., position, velocity, acceleration, type, size, etc.) associated with the moving target.

In some implementations, the data in the higher-dimensional state space 140 includes presumed information related to one or more states associated with the moving target. The data in the higher-dimensional state space 140 is updated by the data 135 received from the projective particle filter 130 that may include inferred higher-dimensional information generated by combining the data received in the lower-dimensional space 120 from the sensors. it is understood that the data generated by the sensors 120 are raw data including clutter, which have to be pre-processed (e.g., registered and clutter removed) before being used by the projective particle filter 130. The higher dimensional (e.g., 3-D) data 142 in the higher-dimensional state space 140 is projected by the sensors 110 to the sensor space (e.g., images) as explained in more details herein to attain corresponding measurements (e.g., pixel intensities) from the images.

The system 100B shown in FIG. 1B, is an example implementation of the system 100A, where the projective particle filter 130 is similar to the projective particle filter of FIG. 1, however, the data processed by the projective particle filter 130 include the 2-D images 125 produced by cameras (e.g., IR camera) of the satellite system 150. The cameras may be installed on a number of (e.g., two or more) satellites of the satellite system 150. The feature extraction block may register observations (e.g. 2-D images) 125 and remove clutter (e.g. background). The higher-dimensional information 138 generated by the projective particle filter 130 may include estimated information regarding the moving target, for example, the estimated 3-D trajectory of moving target, a size, and/or a type of the moving target. The arrow 152 indicates the sampling of the high-dimensional space 140 within satellite system 150 by the projective particle filter 130.

Figure 2:
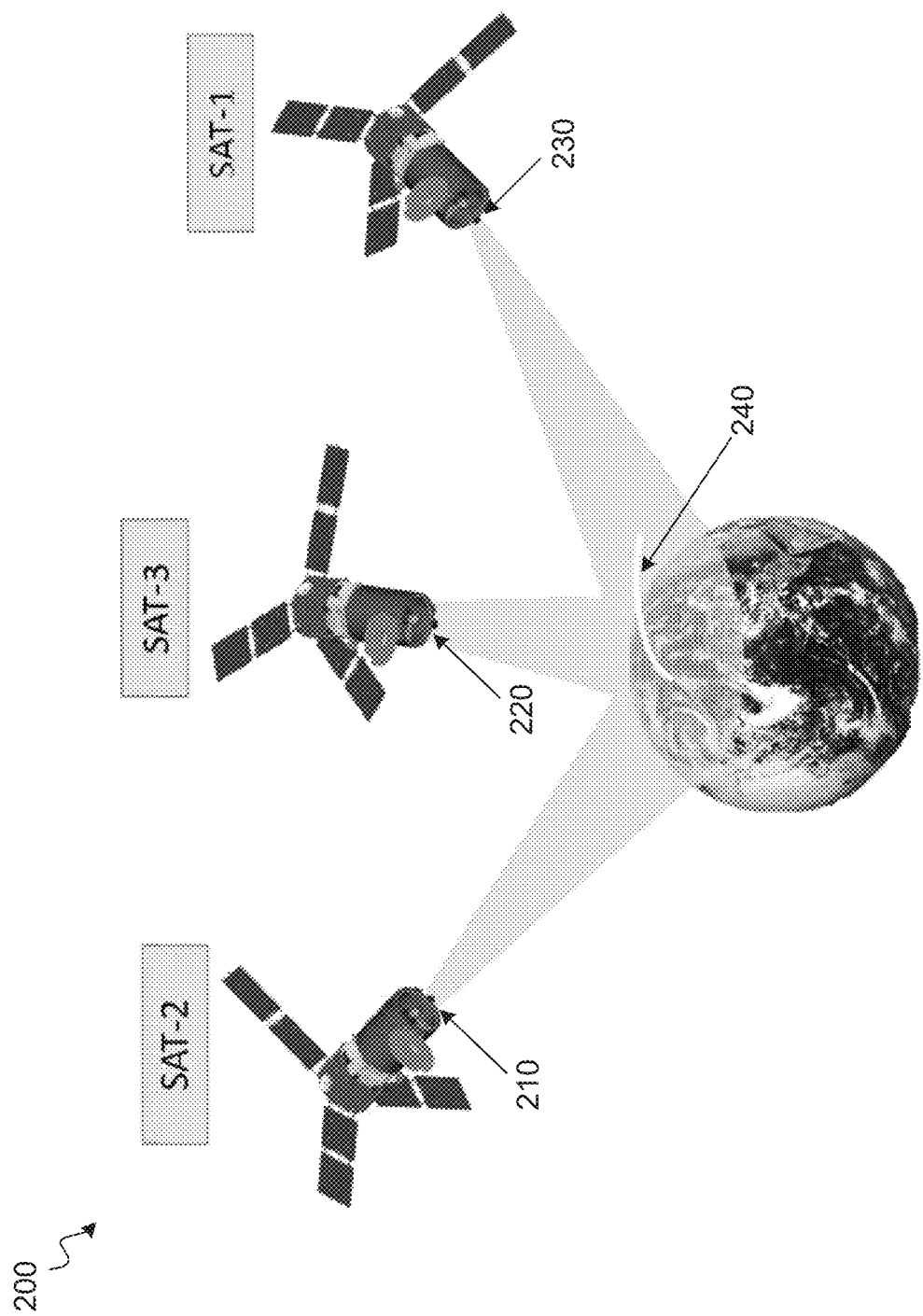
FIG. 2 is a high-level diagram illustrating an example of a multi-sensor target tracking scenario, according to certain embodiments.

FIG. 2 is a high-level diagram illustrating an example of a multi-sensor target tracking scenario 200, according to certain embodiments. In the scenario 200, shown in FIG. 2, three satellites 210, 220, and 230 are used. In some embodiments, the number of satellites may be more than three satellites. The satellites 210, 220, and 230 may be positioned in one or more orbits at various longitudinal locations (e.g., 70, 100, and 140 degrees). The satellites 210, 220, and 230 are configured to look down on the Earth and are equipped with cameras (e.g., IR cameras) to cover a specific common area on the Earth surface. Each camera has a number of attributes (e.g., parameters) such as, a focal length, a field of view, a pixel size, an image size, and a direction that the camera is facing at each moment of time. The subject technology leverages the satellites 210, 220, and 230 to observe 3-D trajectory 240 of a moving target. An estimate of the 3-D trajectory 240 is generated based on 2-D images produced by the cameras, as described herein.

Figure 3:
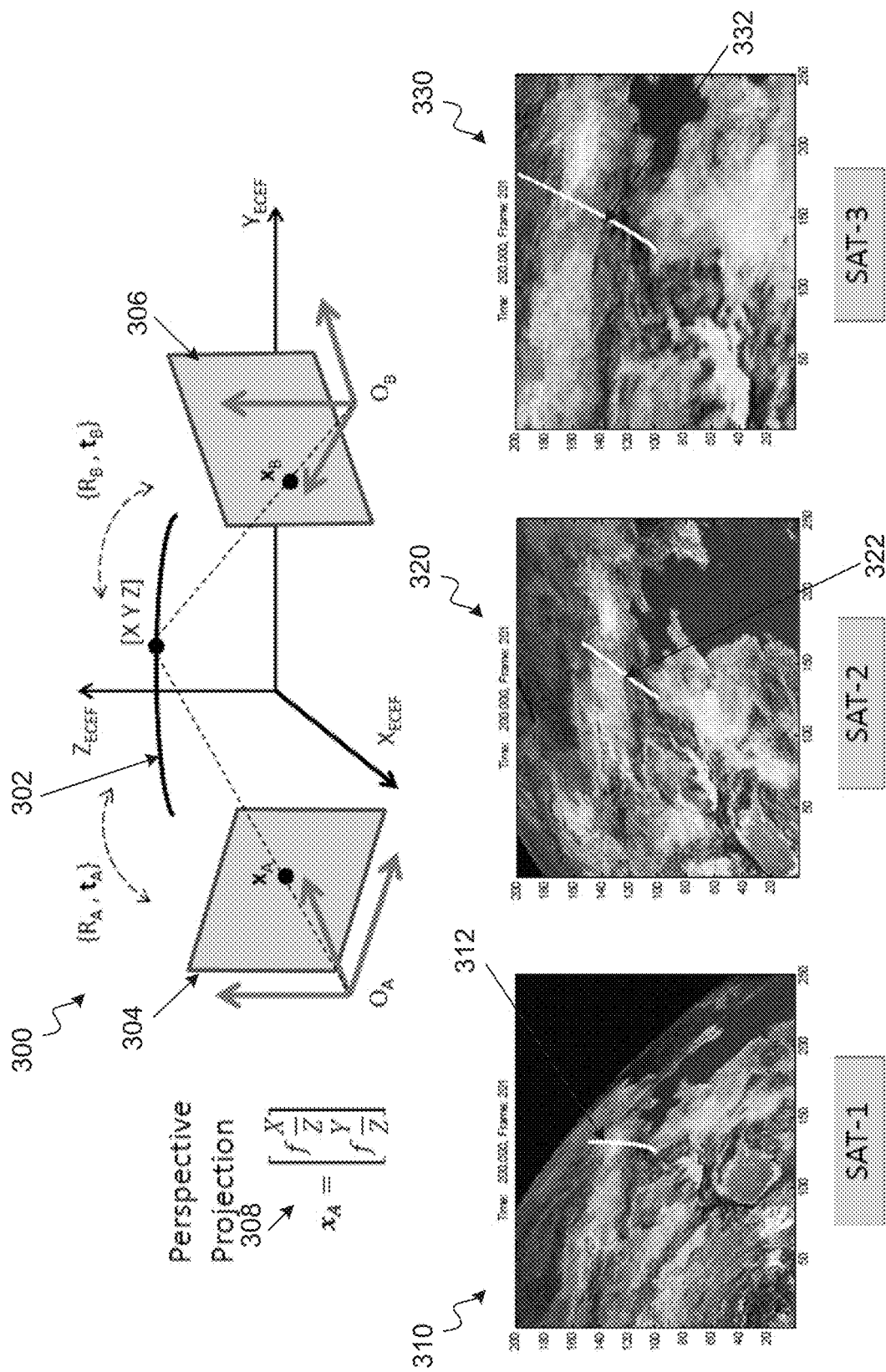
FIG. 3 is a diagram illustrating an example of a target trajectory projection and corresponding observation spaces, according to certain embodiments.

FIG. 3 is a diagram illustrating an example of a target trajectory projection 300 and corresponding observation spaces 310, 320, and 330, according to certain embodiments. A target trajectory 302 is an example 3-D trajectory that is projected to the image planes 304 and 306 of two cameras of a satellite system (e.g., 200 of FIG. 2). As seen from diagram 300, the target trajectory 302 is shown in an Earth center Earth fixed (ECEF) coordinates system $(X_{ECEF}, Y_{ECEF}, Z_{ECEF})$ and projected to the image planes 304 and 306 using rotation and translations $\{R_A, t_A\}$ and $\{R_B, t_B\}$, based on a perspective projection 308. For example, a point [X,Y,Z] of the trajectory 302 is projected to points $X_A$ in the image plane 304 and $X_B$ in the image plane 306. The projection of the trajectory 302 is seen as 2-D trajectories 312, 322, and 332 onto the actual 2-D images 310, 320, and 330 produced by cameras of the satellite system.

Figure 4A:
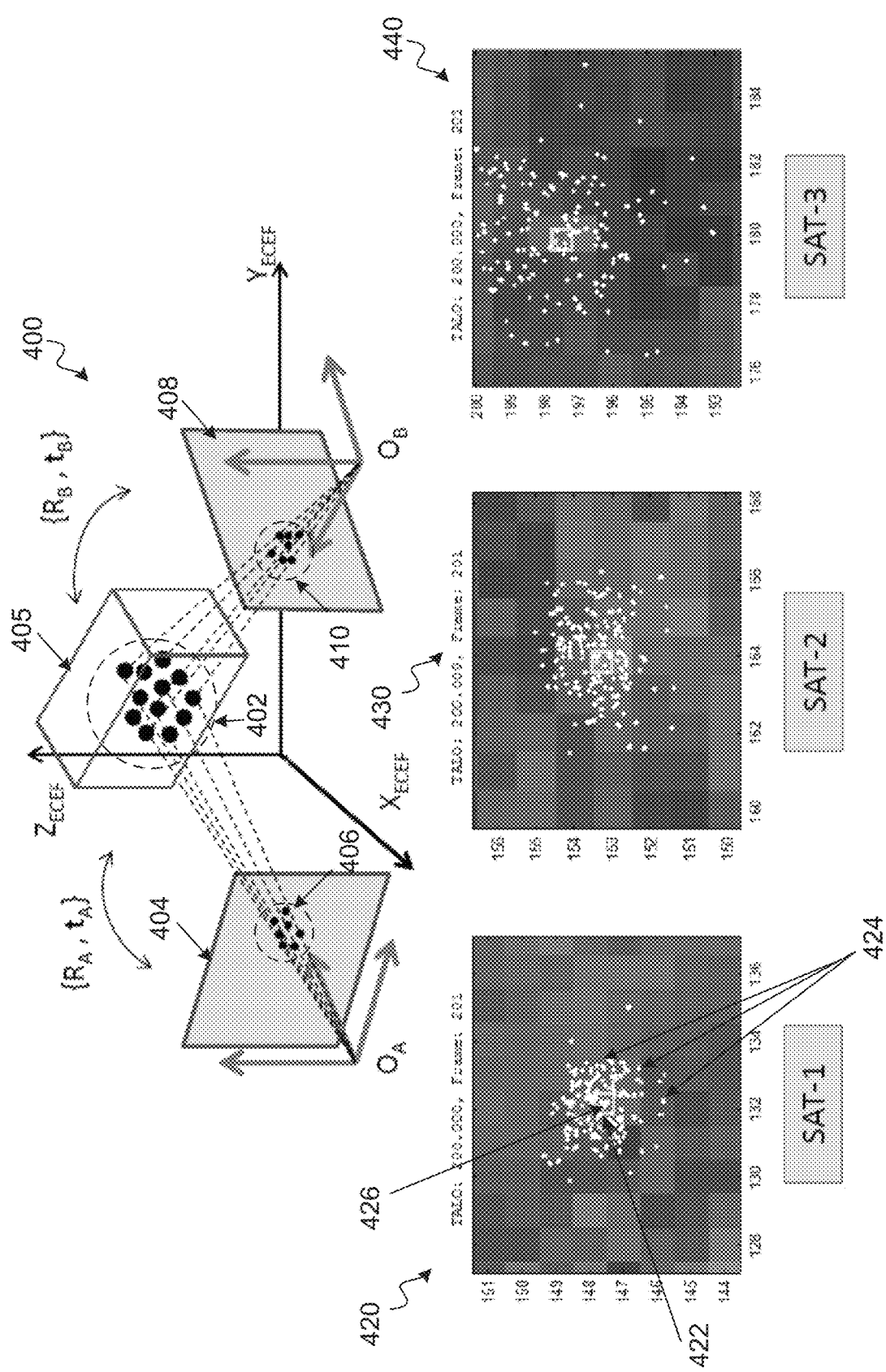
FIGS. 4A-4B are diagrams illustrating an example implementation of projecting particle data onto an observation space and corresponding mathematical representation, according to certain embodiments.
Figure 4B:
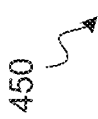

FIGS. 4A-4B are diagrams illustrating an example implementation of projecting particle data onto an observation space and corresponding mathematical representation, according to certain embodiments. The diagram 400 shows projection of a group of particles 402 from a 3-D space 405 onto groups of points 406 and 410 on the image planes 404 and 408, respectively, using camera parameters. The camera parameters include, but are not limited to, a focal length, a field of view, a pixel size, an image size, and a direction that the camera is facing at each moment of time. The image planes 404 and 408 are each an observation space, where the three dimensional particle data are projected onto. The group of particles 402 are the result of discretization of the 3-D space 405 using a projective particle filter (e.g., 130 of FIG. 1A). The high-dimensional space 405 indicates the state space, each point (e.g., each particle) of which represents particle data such as a state (e.g., a position, a velocity, an acceleration, a size, a type, etc.) of a moving target.

Because, initially the states of the moving target are unknown, the projective particle filter first assumes a 3-D space 405 above the surface of the Earth as the initial estimate of the state space of the moving target. In this initial state space a uniform density function (likelihood) is assigned to the entire particles of the space. This can be interpreted as assuming that, for example, the trajectory (e.g., the collection of positions) of the moving target could be within the 3-D space 405 and fills all points of the 3-D space 405, of which the group of particles 402 are the discretized points. Each particle of the group of particles 402 is assigned a weight that represents a likelihood that the particle is a true state of the moving target. Over time, as the projective particle filter algorithm progresses with processing of more and more images, particles that are not representing the actual trajectory receive smaller weights and the particles representing an estimated trajectory based on measurement data receive higher weights During the resampling step of the particle filter, particles with larger weights are more likely to be selected for propagation to the next time step, while particles with smaller weights are less likely to be re-sampled.

The projection of the particles of the 3-D space 405 on real camera images 420, 430, and 440 of three satellites (e.g., SAT-1, SAT-2, and SAT-3) are shown as dots 424 (for simplicity, information are only labeled on image 420). On the satellite image 420, the square 422 represents the true location of an assumed target (not known to the particle filter). The dots 424 are seen to be clustered around the square 422 and a weighted average point 426 of all points 424 is seen to fall inside the square 422. The weighted average is formed by multiplying location of each dot 424 by a weighting function (likelihood). The assigned weights derived from the pixel intensities of image 420 correspond to time after liftoff (TALO) of 200 seconds. The assigned weights for each satellite are updated over time using many images received from that satellite.

The likelihoods from various satellites are combined to obtain a joint likelihood $p(Z^{s(k)}|X^i_k)$ as shown in the equation 450 of FIG. 4B, where the combination (fusion) of the probabilities $p(Z^j_k|X^i_k)$ of various sensors (e.g., cameras of the satellites) is expressed as the product of the probabilities because cameras are independent from one another. The likelihood (probability) $p(Z^j_k|X^j_k)$ derived from each sensor (e.g., image of a satellite camera) is shown to be a product of the individual likelihoods of the projected particles, which are to be derived using the measurement data (e.g. the measured intensities of the sensor images). The computed joint likelihoods could represent weights for particles. The particles and their associated weights are used in estimating the high-dimensional information 138 of FIG. 1B.

Figure 5:
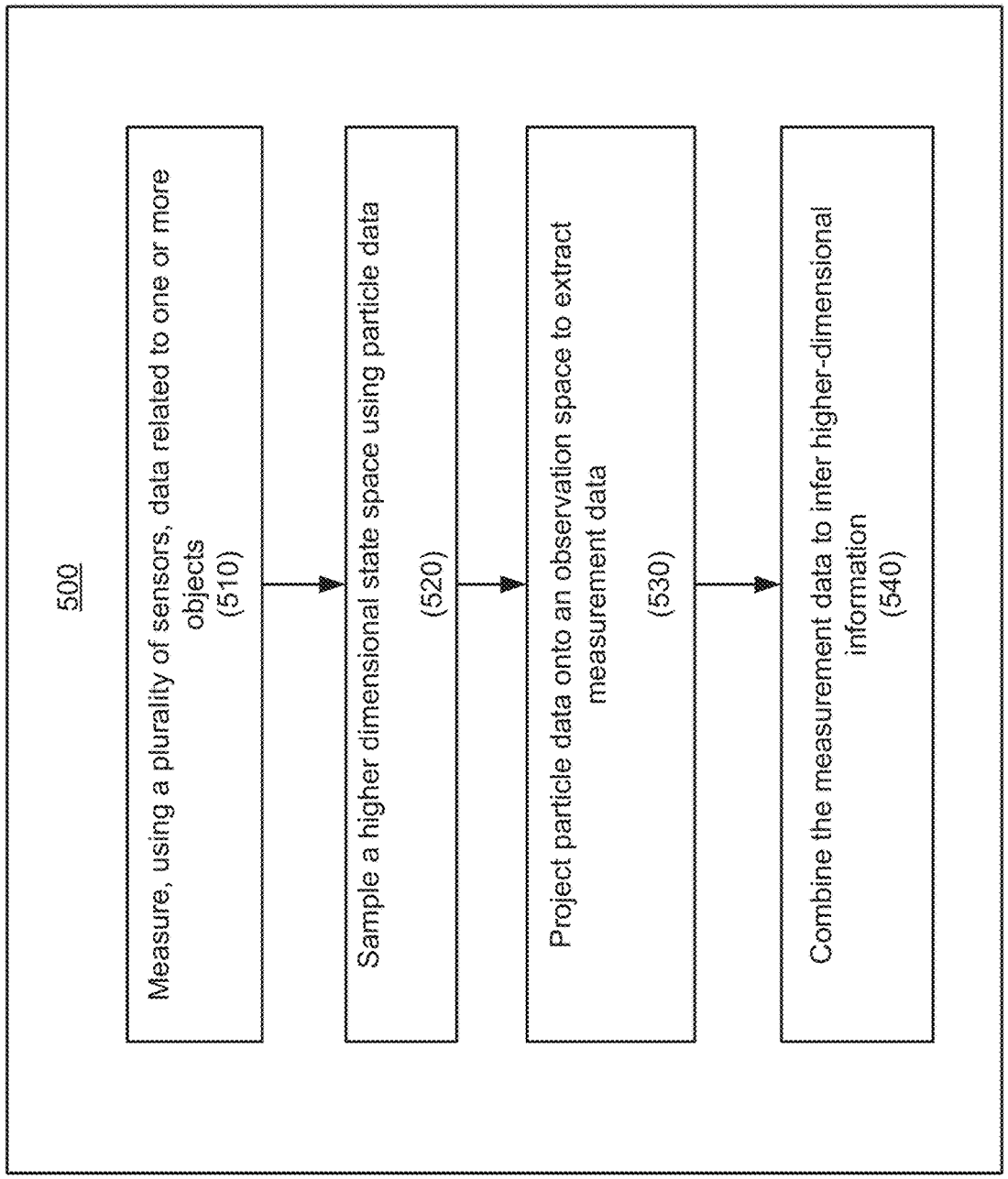
FIG. 5 is a diagram illustrating an example of a method for multi-sensor fusion using a projective particle filter, according to certain embodiments.

FIG. 5 is a diagram illustrating an example of a method 500 for multi-sensor fusion using a projective particle filter 130 of FIG. 1, according to certain embodiments. According to the method 500, using a plurality of sensors (e.g., 110 of FIG. 1A), data related to one or more objects are measured (510). A higher dimensional state space (e.g., 140 of FIG. A or 405 of FIG. 4A) may be sampled using particle (e.g., 402 of FIG. 4A) data (520). Particle data may be projected onto an observation space (e.g., 404 and 408 or 420, 430, and 440 of FIG. 4A) to extract measurement data (e.g. pixel intensities) (530). The measurement data are combined as depicted in FIG. 4B to infer higher-dimensional information (e.g., 138 of FIG. 1B) including position, velocity, acceleration, type, and/or size associated with the one or more objects (e.g., a moving target). The higher-dimensional information includes estimated information related to one or more states associated with the one or more objects.

Figure 6:
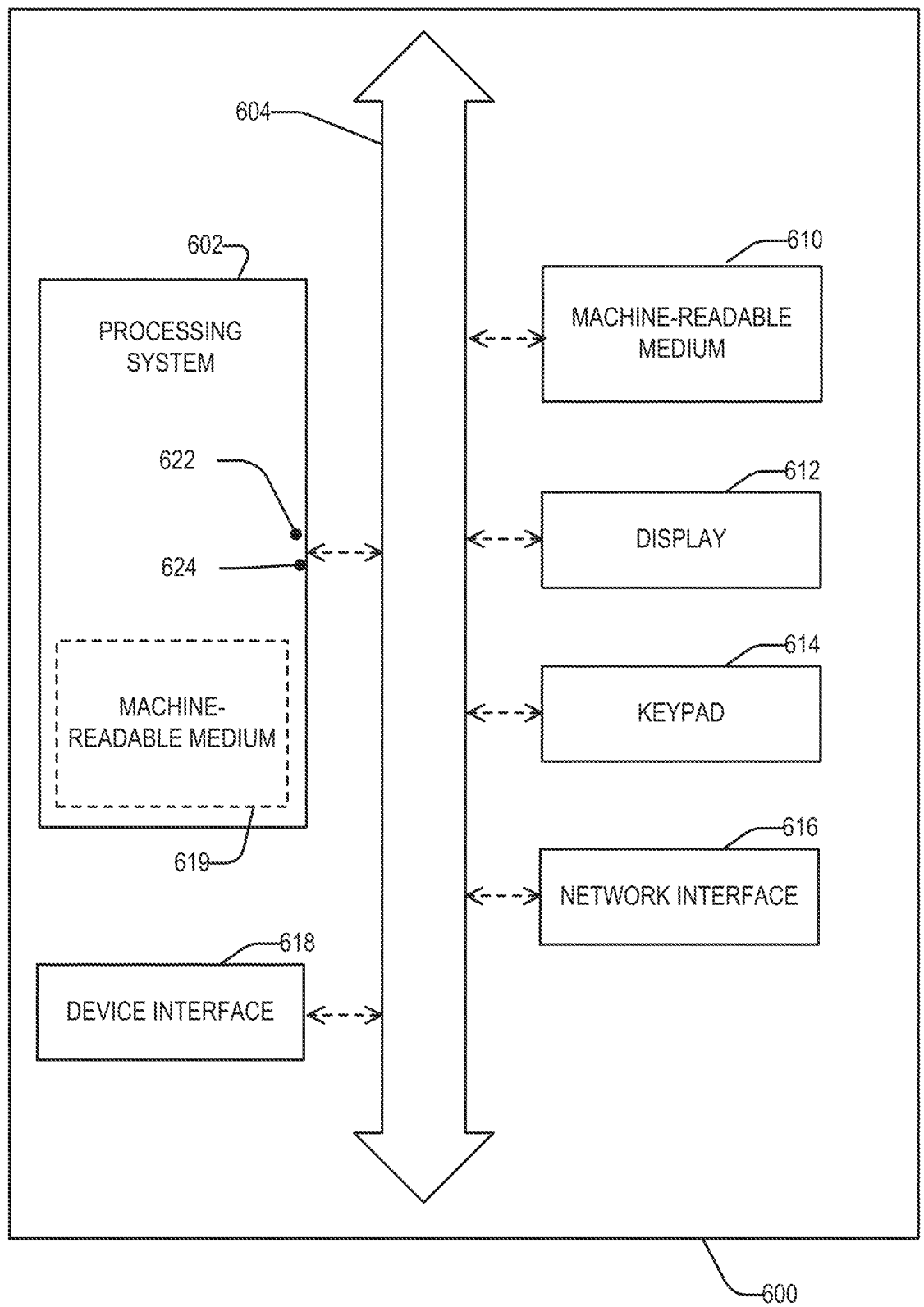
FIG. 6 is a diagram illustrating an example of a system for implementing some aspects of the subject technology.

FIG. 6 is a diagram illustrating an example of a system for implementing some aspects of the subject technology. The system 600, for example, may be a system that the projective particle filter 130 of FIG. 1A is implemented on or may perform the functionalities of the projective particle filter 130 of FIG. 1A. In some implementations, the system 600 may perform simulations described herein. The system 600 includes a processing system 602, which may include one or more processors or one or more processing systems. A processor can be one or more processors. The processing system 602 may include a general-purpose processor or a specific-purpose processor for executing instructions and may further include a machine-readable medium 619, such as a volatile or non-volatile memory, for storing data and/or instructions for software programs. The instructions, which may be stored in a machine-readable medium 610 and/or 619, may be executed by the processing system 602 to control and manage access to the various networks, as well as provide other communication and processing functions. The instructions may also include instructions executed by the processing system 602 for various user interface devices, such as a display 612 and a keypad 614. The processing system 602 may include an input port 622 and an output port 624. Each of the input port 622 and the output port 624 may include one or more ports. The input port 622 and the output port 624 may be the same port (e.g., a bi-directional port) or may be different ports.

The processing system 602 may be implemented using software, hardware, or a combination of both. By way of example, the processing system 602 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

In one or more implementations, the transformation means (e.g., algorithms) and the signal processing of the subject technology may be performed by the processing system 602. For example, the processing system 602 may perform the functionality of the projective particle filter 130 of FIG. 1A or other or computational functions or simulations described herein.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 619) may include storage integrated into a processing system such as might be the case with an ASIC. Machine-readable media (e.g., 610) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. Those skilled in the art recognizes how best to implement the described functionality for the processing system 602. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by the processing system 602 or one or more processors. Instructions can be, for example, a computer program including code for performing methods of the subject technology.

A network interface 616 may be any type of interface to a network (e.g., an Internet network interface), and may reside between any of the components shown in FIG. 6 and coupled to the processor via the bus 604.

A device interface 618 may be any type of interface to a device and may reside between any of the components shown in FIG. 6. A device interface 618 may, for example, be an interface to an external device that plugs into a port (e.g., USB port) of the system 600.

Figure 7:
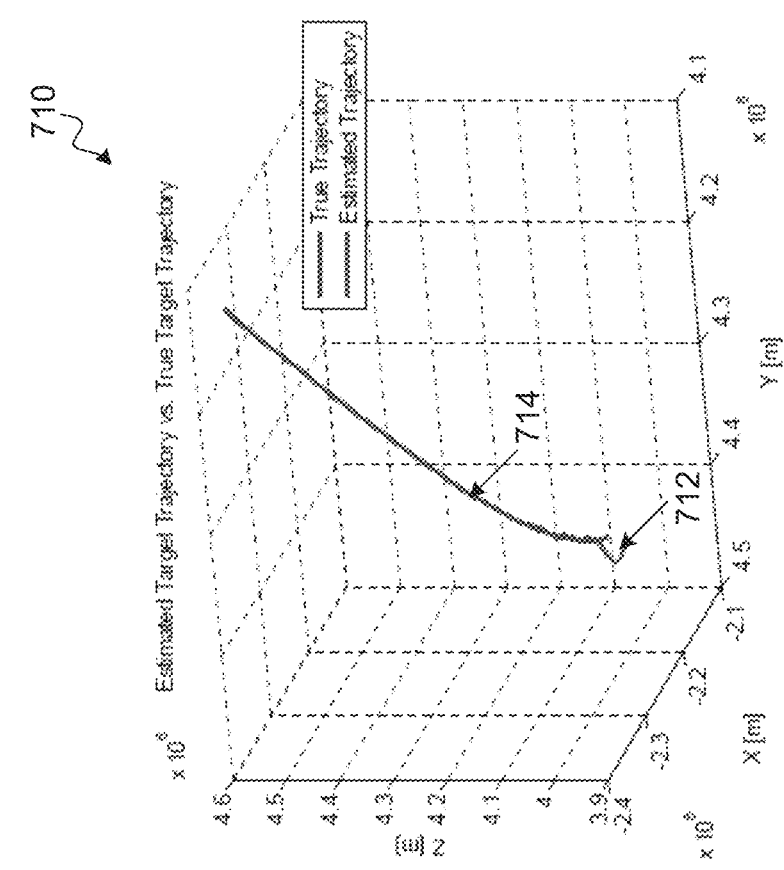
FIG. 7 shows diagrams illustrating examples of estimation results, according to certain embodiments.
Figure 7:
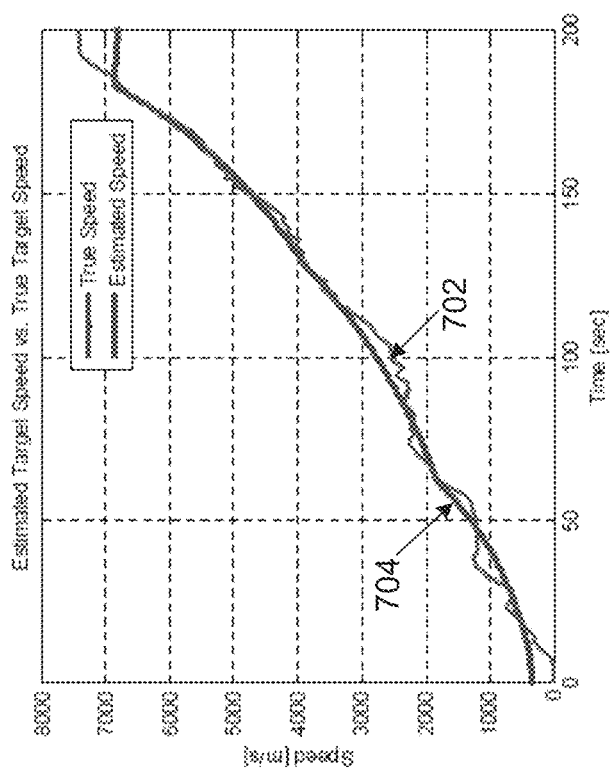

FIG. 7 shows diagrams illustrating examples of estimation results, according to certain embodiments. The plots 702 and 704 shown in diagram 700 of FIG. 7 depict estimated and true target speed values versus time. The estimated values are obtained based on particle statistics such as mean and covariance using the projective particle filter algorithm described above. The comparison shows that estimated values 702 closely follow the actual speed values 704. The plots 712 and 714 shown in diagram 710 of FIG. 7 depict estimated and true 3-D target trajectories in the ECEF coordinates system. The estimated trajectory 712 is obtained using the projective particle filter algorithm described above. The estimated trajectory 712 is seen to closely follow the true trajectory 714.

Figure 8:
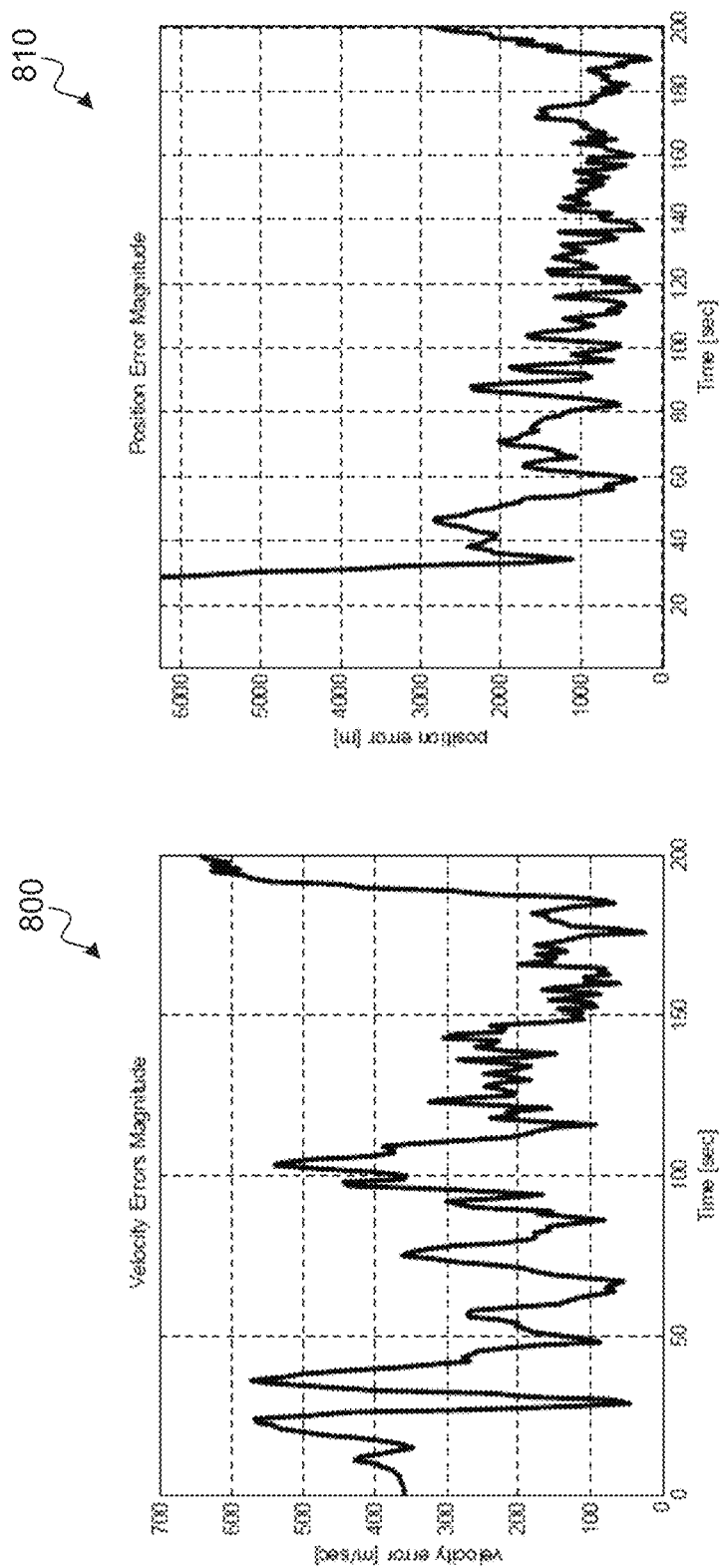
FIG. 8 shows diagrams illustrating examples of estimation errors for projective particle filter, according to certain embodiments.

FIG. 8 shows diagrams illustrating examples of estimation errors for projective particle filter, according to certain embodiments. Diagram 800 shows the velocity error magnitudes (meter/sec) versus time after launch of the moving target. The error magnitudes are to be considered relative to the actual speed of the moving target in the simulated scenario which is on the order of few thousands m/sec. Diagram 810 shows the position error magnitudes (meter) versus time after launch of the moving target. The position error improves over time, as the algorithm converges, and reaches a value of about one kilometer. Given that the satellites could be tens of thousands kilometers away from the Earth achieving the one kilometer error in position estimation is quite an accomplishment.

The foregoing description is provided to enable a person skilled in the art to practice the various configurations described herein. While the subject technology has been particularly described with reference to the various figures and configurations, it should be understood that these are tier illustration purposes only and should not be taken as limiting the scope of the subject technology.

One or more of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Although the invention has been described with reference to the disclosed embodiments, one having ordinary skill in the art will readily appreciate that these embodiments are only illustrative of the invention. it should be understood that various modifications can be made without departing from the spirit of the invention. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is the following:

1. A method for multi-sensor fusion, the method comprising:
measuring, using a plurality of sensors, image data related to one or more flying objects, the plurality of sensors being installed on three satellites configured to look down on the earth, and wherein the plurality of sensors are configured to cover a specific common area on earth surface;
sampling, by a projective particle filter, a higher dimensional state space using particle data related to flying objects;
projecting the particle data related to the flying objects onto a two-dimensional observation space using camera parameters to extract measurement data; and
combining the measurement data to infer higher-dimensional information,
wherein:
the higher dimensional state space comprises presumed information related to one or more states associated with the one or more flying objects and is updated using data received from the projective particle filter, and
the higher-dimensional information comprises estimated information related to one or more states associated with the one or more flying objects.

2. The method of claim 1, wherein measuring the image data related to the one or more flying objects comprises measuring two-dimensional (2-D) images of the one or more flying objects, and wherein the one or more flying objects comprise one or more moving targets.

3. The method of claim 1, the particle data related to the flying objects comprises data associated with points in a three-dimensional (3-D) space, wherein each particle represents a state of the one or more flying objects, wherein the data associated with each point comprises a weight, wherein the weight associated with each point comprises a likelihood that the point represents a true state of the one or more flying objects.

4. The method of claim 3, wherein the state of the one or more flying objects comprises, a position, a velocity, an acceleration, and a size of a moving target.

5. The method of claim 1, wherein the plurality of sensors comprise a plurality of electro-optical (EO) sensors, wherein the plurality of EO sensors comprise a plurality of cameras, wherein projecting particle data related to the flying objects onto an observation space comprises projecting particle data related to the flying objects to an image plane of a camera, wherein the measurement data comprises an intensity associated with a location, in a measured image of the camera, that corresponds to the projected particle data related to the flying objects.

6. The method of claim 5, wherein camera parameters comprise, a focal length, a field of view, a pixel size, an image size, and a direction that the camera is facing at each moment of time, and wherein the cameras are positioned on two or more satellites.

7. The method of claim 1, wherein the presumed information related to one or more states associated with the one or more flying objects comprises likelihood values associated with each state of a moving target, wherein each likelihood value indicates a probability associated with that state being a true state of the moving target, wherein initially the likelihood values are chosen based on a probability distribution, and wherein the probability distribution comprises a uniform distribution.

8. The method of claim 1, wherein the estimated information related to the one or more states associated with the one or more flying objects comprises estimated information related to at least one of a position, a velocity, and an acceleration of a moving target, and wherein the method further comprises combing the estimated information to provide an estimate of a track of the moving target in a 3-D space.

9. A system for performing multi-sensor fusion, the system comprising:
a plurality of sensors configured to measure data related to one or more flying objects, the plurality of sensors being installed on three satellites configured to look down on the earth, and wherein the plurality of sensors are configured to cover a specific common area on earth surface; and
a projective particle filter comprising:
a sampling block configured to sample a higher dimensional state space using particle data related to flying objects;
a projection block configured to project the particle data related to the flying objects onto a two-dimensional observation space using camera parameters to extract measurement data; and
a fusion block configured to combine the measurement data to infer higher-dimensional information,
wherein:
the higher dimensional state space comprises presumed information related to one or more states associated with the one or more flying objects and is updated using data received from the projective particle filter,
the higher-dimensional information comprises estimated information related to one or more states associated with the one or more flying objects.

10. The system of claim 9, wherein the plurality of sensors are configured to measure the data related to the one or more flying objects by measuring two-dimensional (2-D) images of the one or more flying objects, and wherein the one or more flying objects comprise one or more moving targets.

11. The system of claim 9, the particle data related to the flying objects comprises data associated with points in a three-dimensional (3-D) space, wherein each particle represent a state of the one or more flying objects, wherein the state of the one or more flying objects comprises, a position, a velocity, an acceleration, and a size of a moving target.

12. The system of claim 11, wherein the data associated with each point comprises a weight, wherein the weight associated with each point comprises a likelihood that the point represents a true state of the one or more flying objects.

13. The system of claim 9, wherein the plurality of sensors comprise a plurality of electro-optical (EO) sensors, wherein the plurality of EO sensors comprise a plurality of cameras, wherein the measurement data comprises an intensity associated with a location, in a measured image of the camera, that corresponds to the projected particle data related to the flying objects.

14. The system of claim 13, wherein the projection block is configured to project particle data related to the flying objects onto the observation space by using camera parameters, wherein the camera parameters comprise, a focal length, a field of view, a pixel size, an image size, and a direction that the camera is facing at each moment of time, and wherein the cameras are positioned on two or more satellites.

15. The system of claim 9, wherein the presumed information related to the one or more states associated with the one or more flying objects comprise likelihood values associated with each state of a moving target, wherein each likelihood value indicates a probability associated with that state being a true state of the moving target, wherein the projective particle filter is configured to initially choose the likelihood values based on a probability distribution, and wherein the probability distribution comprises a uniform distribution.

16. The system of claim 9, wherein the fusion block is configured to estimate information related to the one or more states associated with the one or more flying objects by estimating at least one of a position, a velocity, and an acceleration of a moving target, and wherein the projective particle filter is configured to combine the estimated information to provide an estimate of a track of the moving target in a 3-D space.

17. A system comprising:
a plurality of sensors configured to measure data related to a space moving target, the plurality of sensors being installed on three satellites configured to look down on the earth, and wherein the plurality of sensors are configured to cover a specific common area on earth surface; and
a projective particle filter comprising:
a sampling block configured to sample a higher dimensional state space using particle data related to the space moving target and associated with points in a three-dimensional (3-D) space, the higher dimensional state space comprising presumed information related to one or more states associated with the space moving target;
a projection block configured to project the particle data related to the space, moving target onto a two-dimensional observation space including measurement data related to the space moving target to extract measurement data; and
a fusion block configured to combine the measurement data to infer higher-dimensional information including information related to one or more states associated with the space moving target, wherein a state associated with the space moving target comprises a type of the space moving target.

18. The system of claim 17, wherein the plurality of sensors are configured to measure two-dimensional (2-D) images of the space moving target, wherein the higher dimensional state space comprises presumed information related to one or more states associated with the space moving target.

19. The system of claim 17, wherein each particle represents a state of the space moving target, wherein the state of the space moving target comprises, a position, a velocity, an acceleration, and a size of a moving target.

20. The system of claim 17, wherein the particle data related to the flying objects associated with each point comprises a weight, wherein the weight associated with each point comprises a likelihood that the point represents a true state of the space moving target.

* * * * *